US012044426B2

(12) United States Patent
Komatsu et al.

(10) Patent No.: US 12,044,426 B2
(45) Date of Patent: Jul. 23, 2024

(54) FAN UNIT

(71) Applicant: DAIKIN INDUSTRIES, LTD., Osaka (JP)

(72) Inventors: Akira Komatsu, Osaka (JP); Shuuichi Tanaka, Osaka (JP); Tooru Fujimoto, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

(21) Appl. No.: 18/106,178

(22) Filed: Feb. 6, 2023

(65) Prior Publication Data

US 2023/0184456 A1 Jun. 15, 2023

Related U.S. Application Data

(63) Continuation of application No. PCT/JP2021/028771, filed on Aug. 3, 2021.

(30) Foreign Application Priority Data

Aug. 7, 2020 (JP) ................................ 2020-134853

(51) Int. Cl.
*F24F 11/77* (2018.01)
*F24F 11/63* (2018.01)
(Continued)

(52) U.S. Cl.
CPC .............. *F24F 11/77* (2018.01); *F24F 11/63* (2018.01); *G05B 19/042* (2013.01); (Continued)

(58) Field of Classification Search
None
See application file for complete search history.

(56) References Cited

U.S. PATENT DOCUMENTS 4,255,089 A 3/1981 Phillips, Jr. et al.
6,243,610 B1 * 6/2001 Iino ..................... G05B 13/042 700/32

(Continued)

FOREIGN PATENT DOCUMENTS

CN 109654675 A * 4/2019
CN 110220267 A 9/2019

(Continued)

OTHER PUBLICATIONS

International Search Report (PCT/ISA/210) issued in PCT/JP2021/028771, dated Oct. 26, 2021.

(Continued)

*Primary Examiner* — Thomas C Lee
*Assistant Examiner* — Anzuman Sharmin
(74) *Attorney, Agent, or Firm* — BIRCH, STEWART, KOLASCH & BIRCH, LLP

(57) ABSTRACT

A fan unit reduces the number of man-hours for a preliminary test and eliminates the need for a trial run at the time of duct connection are realized. A second controller acquires: a rotation speed of a fan motor of a second fan; a volume of air, a wind speed, or front-rear differential pressure of the second fan; and an air volume target value or a wind speed target value for the second fan, and calculates a rotation speed target value Ny for the fan motor 31*b* by using a first function: $Ny=(Qy/Qx)^2\times\Delta Px\times\{m\times(Qy/Qx)\times Vx+p\}+n\times(Qy/Qx)\times Vx+q$. Furthermore, when the front-rear differential pressure fluctuates and the wind speed is decreased from Vt to V, the second controller calculates a rotation speed change amount to the rotation speed target value by using a second function: $\Delta N=a\times(Vt-V)$.

9 Claims, 9 Drawing Sheets

(51) Int. Cl.
*F24F 110/30* (2018.01)
*F24F 110/40* (2018.01)
*G05B 19/042* (2006.01)

(52) U.S. Cl.
CPC ....... *F24F 2110/30* (2018.01); *F24F 2110/40* (2018.01); *G05B 2219/2614* (2013.01)

(56) References Cited

U.S. PATENT DOCUMENTS

| | | | | |
|---|---|---|---|---|
| 7,625,277 | B2 * | 12/2009 | Palmer | A61L 9/20 454/238 |
| 8,814,639 | B1 | 8/2014 | Mecozzi | |
| 2007/0032187 | A1 * | 2/2007 | Liu | F24F 11/0001 454/186 |
| 2013/0180700 | A1 | 7/2013 | Aycock | |
| 2013/0306264 | A1 | 11/2013 | Zeolla et al. | |
| 2014/0330447 | A1 * | 11/2014 | VanGilder | H05K 7/20745 700/300 |
| 2015/0166186 | A1 | 6/2015 | Zywiak et al. | |
| 2015/0300359 | A1 | 10/2015 | Kashihara et al. | |
| 2018/0210474 | A1 | 7/2018 | D'Silva et al. | |
| 2021/0048220 | A1 | 2/2021 | Teraoka et al. | |
| 2021/0270478 | A1 | 9/2021 | Steckenborn et al. | |
| 2022/0412626 | A1 | 12/2022 | Sishtla | |

FOREIGN PATENT DOCUMENTS

| | | | | |
|---|---|---|---|---|
| DE | 10 2018 117 514 | A1 | 1/2020 | |
| GB | 2548526 | A | 9/2017 | |
| JP | 4-32634 | A | 2/1992 | |
| JP | 5-118635 | A | 5/1993 | |
| JP | 6-257841 | A | 9/1994 | |
| JP | 10-253132 | A | 9/1998 | |
| JP | 2000-199495 | A | 7/2000 | |
| JP | 2005107862 | A * | 4/2005 | |
| JP | 3716826 | B2 * | 11/2005 | |
| JP | 3736415 | B2 * | 1/2006 | |
| JP | 2009-264622 | A | 11/2009 | |
| JP | 2015-212610 | A | 11/2015 | |
| JP | 2016-166698 | A | 9/2016 | |
| WO | WO-2007004446 | A1 * | 1/2007 | F24F 11/0001 |
| WO | WO 2016/125258 | A1 | 8/2016 | |

OTHER PUBLICATIONS

International Search Report (PCT/ISA/210) issued in PCT/JP2021/028772, dated Oct. 26, 2021.

International Search Report (PCT/ISA/210) issued in PCT/JP2021/028773, dated Oct. 26, 2021.

Written Opinion of the International Searching Authority(PCT/ISA/237) issued in PCT/JP2021/028771, dated Oct. 26, 2021.

International Preliminary Report on Patentability and English translation of the Written Opinion of the International Searching Authority for International Application No. PCT/JP2021/028771, dated Feb. 16, 2023.

International Preliminary Report on Patentability and English translation of the Written Opinion of the International Searching Authority for International Application No. PCT/JP2021/028772, dated Feb. 16, 2023.

International Preliminary Report on Patentability and English translation of the Written Opinion of the International Searching Authority for International Application No. PCT/JP2021/028773, dated Feb. 16, 2023.

Extended European Search Report for European Application No. 21853455.0, dated Jan. 3, 2024.

Extended European Search Report for European Application No. 21853976.5, dated Nov. 28, 2023.

Extended European Search Report for European Application No. 21854528.3, dated Dec. 4, 2023.

* cited by examiner

FAN UNIT

CROSS REFERENCE TO RELATED APPLICATIONS

This application is a Continuation of PCT International Application No. PCT/JP2021/028771, filed on Aug. 3, 2021, which claims priority under 35 U.S.C. 119(a) to Patent Application No. JP 2020-134853, filed in Japan on Aug. 7, 2020, all of which are hereby expressly incorporated by reference into the present application.

TECHNICAL FIELD

The present disclosure relates to a fan unit including a fan that sends heat-exchanged air.

BACKGROUND ART

Conventionally, an air conditioning system that controls a rotation speed of a fan for conditioning air in a room has been widely used. For example, Patent Literature 1 (JP H10-253132 A) discloses an air conditioning system including: an air conditioning unit including a heat exchanger and an air conditioning fan; a plurality of ventilation units each including a fan; and ducts through which the air conditioning unit distributes conditioned air to the ventilation units.

SUMMARY

A fan unit according to a first aspect is a fan unit connected to a first unit through a duct, and includes a fan, a casing, a first acquisition unit, a second acquisition unit, a third acquisition unit, and a control unit. The fan supplies air to a target space. The casing has an intake port and a blow-out port and houses the fan. The first acquisition unit acquires the rotation speed of a fan motor that drives the fan. The second acquisition unit acquires information about at least one from among a volume of air, a wind speed, and front-rear differential pressure of the fan. The front-rear differential pressure is a difference in air pressure between the intake port and the blow-out port of the casing. The third acquisition unit acquires an air volume target value or a wind speed target value for the fan. The control unit controls the rotation speed of the fan motor to a rotation speed target value corresponding to the air volume target value or the wind speed target value for the fan. The control unit uses a first function or a second function that uses, as variables: the rotation speed of the fan motor; the volume of air, the wind speed, or the front-rear differential pressure of the fan; and the air volume target value or the wind speed target value for the fan, calculates the rotation speed target value for the fan motor by the first function, and calculates a rotation speed change amount from the rotation speed to the rotation speed target value for the fan motor by the second function.

DESCRIPTION OF EMBODIMENTS

(1) Overall Configuration

Figure 1:
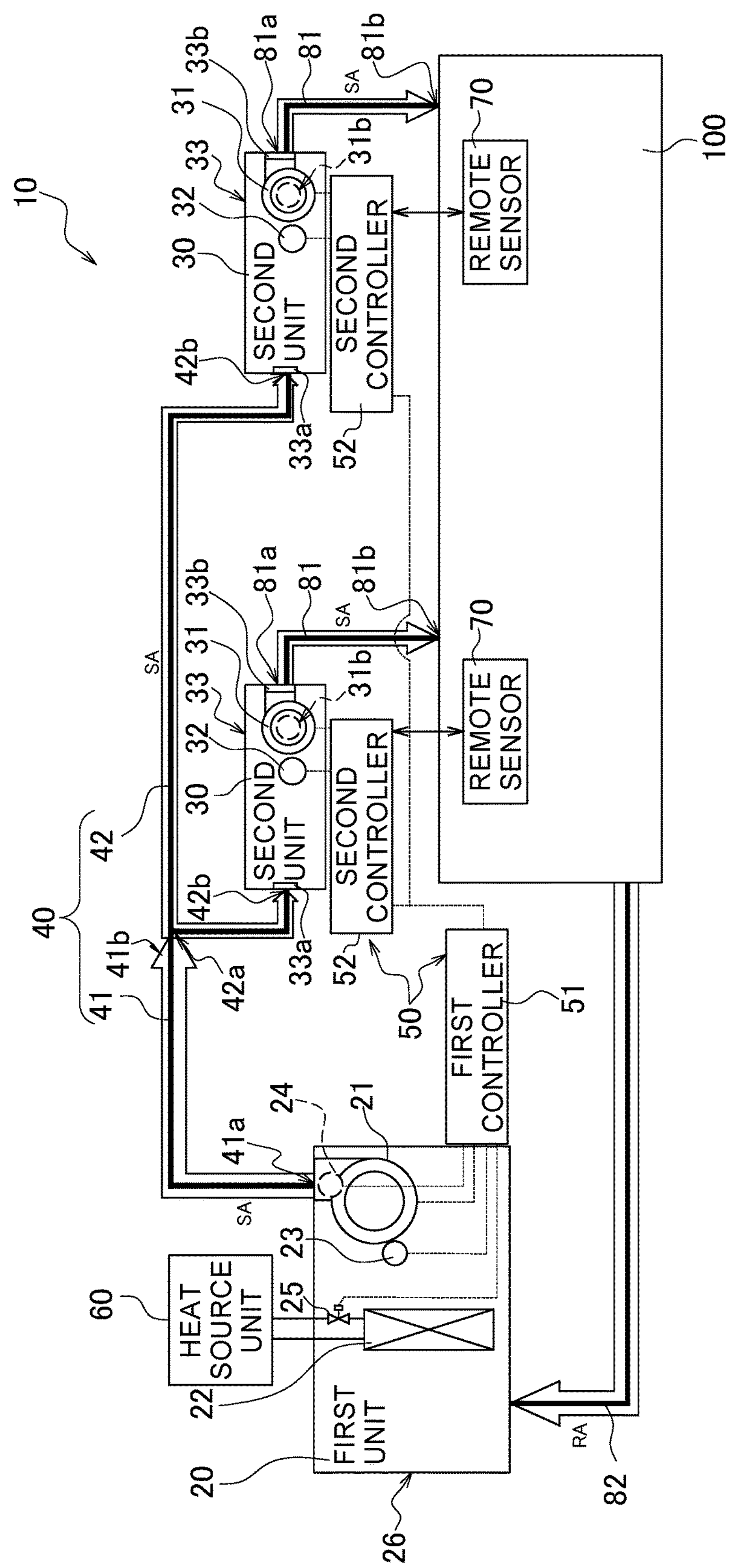
FIG. 1 is a conceptual diagram illustrating the configuration of an air supply system equipped with fan units according to an embodiment of the present disclosure.

FIG. 1 is a configuration diagram of an air supply system 10 equipped with fan units according to an embodiment of the present disclosure. The air supply system 10 in FIG. 1 includes a first unit 20, a plurality of second units 30, a duct 40, and a controller 50. In the present application, for convenience of description, the fan units are referred to as the second units.

The first unit 20 includes a first fan 21. Each second unit 30 includes a second fan 31. Each second fan 31 supplies air from the second unit 30 to a target space 100.

The target space 100 is, for example, a room in a building. The room is a space where the movement of air is restricted by a floor, a ceiling, and walls, for example. The plurality of second units 30 are installed with respect to one or a plurality of target spaces 100.

In FIG. 1, the air supply system 10 including two second units 30 installed with respect to one target space 100 is illustrated as a typical example of the air supply system 10 including a plurality of second units 30.

For example, the number of second units 30 may also be three or more, and is set appropriately. For example, the number of target spaces 100 in which the second units 30 are installed may be two or more.

The duct 40 distributes first air SA delivered from the first unit 20 by the first fan 21 to the plurality of second units 30. The duct 40 includes a main pipe 41 and branch pipes 42 branched off the main pipe 41.

FIG. 1 illustrates a case where the main pipe 41 is disposed outside the first unit 20, but the main pipe 41 may also be disposed inside the first unit 20, and may also be disposed to extend from the inside of the first unit 20 to the outside of the first unit 20.

The case where the main pipe 41 is disposed inside the first unit 20 also includes a case where a portion of a casing 26 of the first unit 20 functions as the main pipe 41. FIG. 1 illustrates an example in which the main pipe 41 has an inlet 41*a* connected to the first unit 20.

The first fan 21 is disposed inside the first unit 20. Here, it is configured that all of the air blown out from the first fan 21 flows into the duct 40.

The main pipe 41 of the duct 40 also has an outlet 41*b* connected to inlets 42*a* of the branch pipes 42. For example, the configuration for branching the main pipe 41 into the branch pipes 42 may be a configuration using a branch chamber.

Each second unit 30 includes a casing 33 having an intake port 33*a* and a blow-out port 33*b*. The branch pipes 42 have a plurality of outlets 42*b* connected to intake ports 33*a* of the plurality of second units 30.

Each second unit 30 is connected to the target space 100 through a ventilation path 81. The ventilation path 81 has an inlet 81*a* connected to the blow-out port 33*b* of the second unit 30. Each second fan 31 produces an air flow from the outlet 42*b* of the duct 40 toward the inlet 81*a* of the ventilation path 81, inside the second unit 30. Therefore, each second fan 31 is suctioning the first air SA from the outlet 42*b* of the branch pipe 42.

Each second fan 31 can change front-rear differential pressure that is a difference in air pressure between the intake port 33*a* and the blow-out port 33*b* of the corresponding second unit 30 by changing a rotation speed of a motor. Assuming that the static pressure in the duct 40 is constant, each second fan 31 can increase the front-rear differential pressure in the corresponding second unit 30 by increasing the rotation speed.

If the front-rear differential pressure in the second unit 30 increases, the volume of the first air SA flowing through the ventilation path 81 increases. This change in volume of flowing air changes the supplied air volume that is blown out from an outlet 81*b* of each ventilation path 81 into the target space 100.

The controller 50 includes a first controller 51 and a plurality of second controllers 52. The first controller 51 and the plurality of second controllers 52 are connected to each other.

The first controller 51 controls the rotation speed of the first fan 21. If the rotation speed of the first fan 21 increases, a volume of air sent by the first fan 21 increases.

One second controller 52 is provided with respect to each second unit 30. Each second controller 52 controls a volume of air of the corresponding second fan 31. Each second controller 52 stores an air volume target value received from the first controller 51.

If the supplied air volume is insufficient with respect to the air volume target value, each second controller 52 increases the rotation speed of the second fan 31. Conversely, if the supplied air volume is excessive with respect to the air volume target value, the second controller 52 reduces the rotation speed of the second fan 31.

The controller 50 obtains information about the volume of air supplied to the target space 100 by a plurality of the second fans 31. The information about the volume of air includes, for example, a necessary volume of air to be supplied into the target space 100 per second or per minute.

Each second controller 52 outputs the information about the volume of air to the first controller 51. The first controller 51 determines the output required from the first fan 21 on the basis of the obtained information about the volume of air.

(2) Detailed Configuration (2-1) First Unit 20

The first unit 20 includes the first fan 21, a heat exchanger 22, a first air volume detector 23, a temperature sensor 24, and a water volume adjustment valve 25.

(2-1-1) Heat Exchanger 22

The heat exchanger 22 is supplied with, for example, cold water or hot water as a heat medium from a heat source unit 60. For example, the heat medium supplied to the heat exchanger 22 may be something other than cold water or hot water, such as brine.

(2-1-2) First Air Volume Detector 23

Examples of the first air volume detector 23 include an air volume sensor, a wind speed sensor, or a differential pressure sensor. In the embodiment, the first air volume detector 23 detects a volume of air sent by the first fan 21.

The first air volume detector 23 is connected to the first controller 51. The first air volume detector 23 transmits the value of the volume of air detected by the first air volume detector 23 to the first controller 51.

The volume of air detected by the first air volume detector 23 is the volume of air flowing through the main pipe 41 of the duct 40, and is also a total volume of air supplied from the plurality of second units 30 to the target space 100.

(2-1-3) Temperature Sensor 24

The temperature sensor 24 detects the temperature of the first air SA sent from the first fan 21 to the duct 40. The temperature sensor 24 is connected to the first controller 51. The temperature sensor 24 inputs the detected value to the first controller 51.

(2-1-4) Water Volume Adjustment Valve 25

The first unit 20 is connected to the target space 100 through a ventilation path 82. Second air RA passing through the ventilation path 82 and returning from the target space 100 is sent out by the first fan 21 to the duct 40 through the heat exchanger 22.

The second air RA returning from the target space 100 is the air that existed inside the target space 100. When passing through the heat exchanger 22, the returning second air RA exchanges heat with the cold water or the hot water flowing through the heat exchanger 22 to become conditioned air.

The water volume adjustment valve 25 adjusts the amount of heat imparted to the first air SA that exchanges heat in the heat exchanger 22 and is sent out to the duct 40. An opening degree of the water volume adjustment valve 25 is controlled by the first controller 51. If the opening degree of the water volume adjustment valve 25 is increased, the volume of water flowing through the heat exchanger 22 increases, so that the amount of heat to be exchanged between the heat exchanger 22 and the first air SA per unit time increases. Conversely, if the opening degree of the water volume adjustment valve 25 is decreased, the volume of water flowing through the heat exchanger 22 decreases, so that the amount of heat to be exchanged between the heat exchanger 22 and the first air SA per unit time decreases.

(2-2) Second Unit 30

The second unit 30 includes the second fan 31, a fan motor 31*b* that rotates the second fan 31, and a second air volume detector 32.

Each fan motor 31*b* is connected to a corresponding one of the second controllers 52, and sends the rotation speed to the second controller 52. Each second air volume detector 32 is connected to a corresponding one of the second controllers 52.

Examples of the second air volume detector 32 include an air volume sensor, a wind speed sensor, or a differential pressure sensor. In the embodiment, the second air volume detector 32 detects a volume of air sent by the second fan 31.

The second air volume detector 32 inputs the detected value of the volume of air to the second controller 52. The volume of air detected by the second air volume detector 32 is the volume of air flowing through the ventilation path 81, and is also the volume of air supplied from each second unit 30 to the target space 100.

(2-3) Remote Sensor 70

A plurality of remote sensors 70 function as temperature sensors. Each remote sensor 70 is configured to transmit data indicating the temperature of the second air RA in the target space 100 to a corresponding second controller 52.

(2-4) Controller 50

Figure 2:
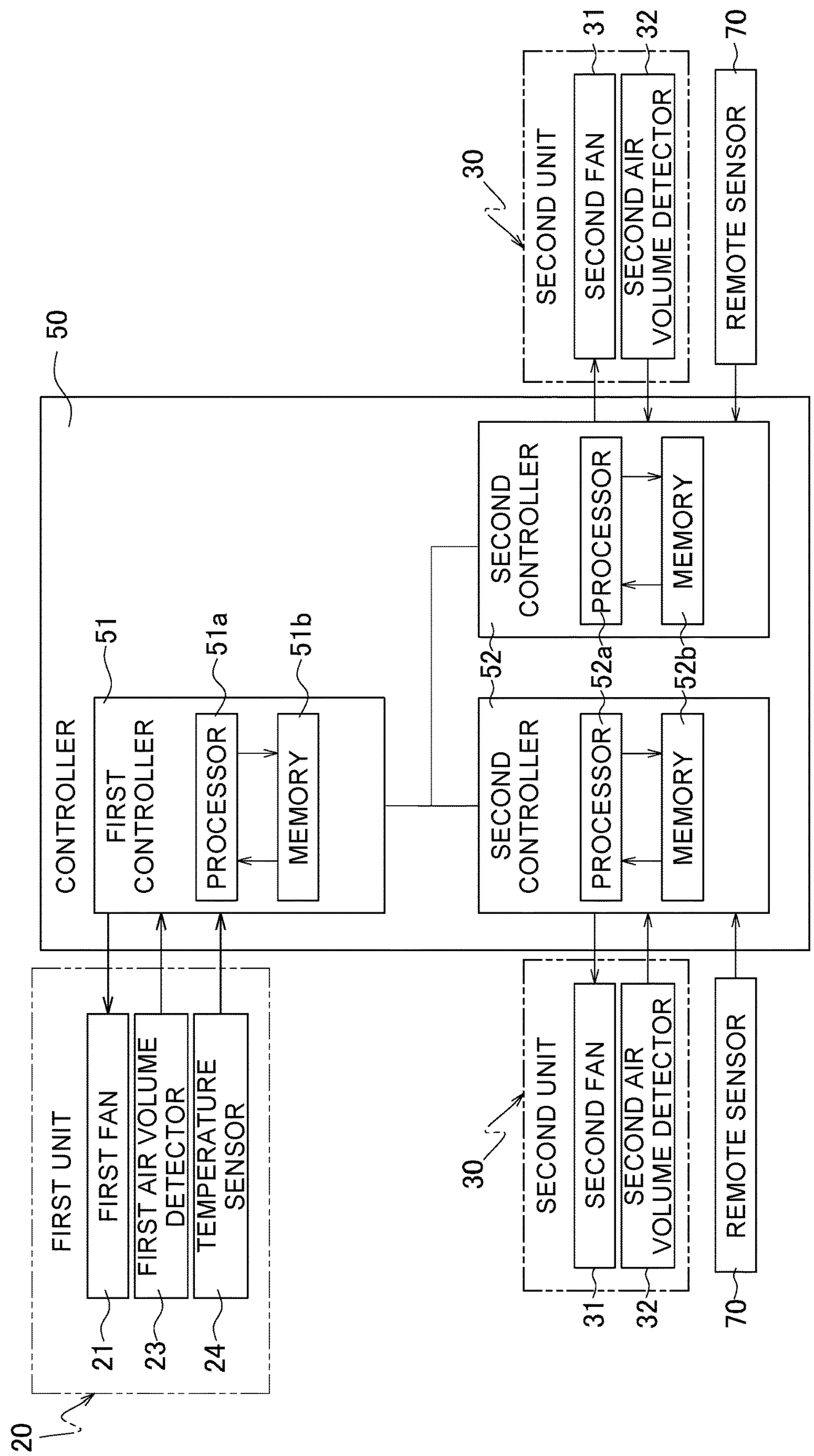
FIG. 2 is a block diagram for describing the configuration of a controller.

FIG. 2 is a block diagram for describing the configuration of the controller 50. The controller 50 in FIG. 2 includes the first controller 51 and the plurality of second controllers 52. The first controller 51 and the plurality of second controllers 52 are connected to each other.

(2-4-1) First Controller 51

The first controller 51 includes a processor 51*a* and a memory 51*b*. The processor 51*a* reads an air volume control program for the first fan 21 stored in the memory 51*b*, and outputs necessary commands to the first fan 21 and each second controller 52.

The memory 51*b* stores detected values of the first air volume detector 23 and the temperature sensor 24 as needed in addition to the air volume control program for the first fan 21.

The processor 51*a* reads the detected values of the first air volume detector 23 and the temperature sensor 24 stored in the memory 51*b*, and calculates an air volume target value for the first fan 21 (a total of target air volume to be supplied to the target space 100).

The above description is an example and the present disclosure is not limited to the above content of description.

(2-4-2) Second Controller 52

Each second controller 52 includes a processor 52*a* and a memory 52*b*. The processor 52*a* reads an air volume control program for the second fan 31 stored in the memory 52*b*, and outputs necessary commands to the second fan 31.

The memory 52*b* stores the air volume target value output from the first controller 51 and a detected value of the second air volume detector 32 as needed in addition to the air volume control program for the second fan 31.

The processor 52*a* reads the air volume target value and the detected value of the second air volume detector 32 stored in the memory 52*b*, and calculates a rotation speed target value of the second fan 31.

The above description is an example and the present invention is not limited to the above content of description.

(3) Outline of Operation of Air Supply System 10

Each second controller 52 receives a temperature measurement value of the target space 100 from a corresponding one of the remote sensors 70 connected thereto. Each second controller 52 holds data indicating a set temperature as a temperature set value.

Each second controller 52 transmits the temperature set value and the temperature measurement value to the first controller 51. The first controller 51 determines an air volume target value for each second unit 30 on the basis of the temperature set value and the temperature measurement value. The first controller 51 transmits the value of the air volume target value to each second controller 52.

The first controller 51 determines the air volume target value for each second fan 31 according to the total of the target air volume to be supplied to the target space 100, and transmits the air volume target value to each second controller 52. Each second controller 52 adjusts the rotation speed of the second fan 31 in the corresponding second unit 30. The rotation speeds of the plurality of second fans 31 are adjusted independently from each other.

Each second controller 52 controls the rotation speed of the corresponding second fan 31 so that the supplied air volume matches the air volume target value. The plurality of second controllers 52 control the rotation speeds of the plurality of second fans 31 independently from each other. If the volume of air detected by the second air volume detector 32 is small compared to the air volume target value, each second controller 52 increases the rotation speed of the corresponding second fan 31. If the volume of air detected by the second air volume detector 32 is large compared to the air volume target value, each second controller 52 reduces the rotation speed of the corresponding second fan 31.

Specific air volume control will be described in the section of "(5) Air volume control".

(4) About Duct Resistance (4-1) Characteristics of Duct Resistance

The length of the duct 40 connecting the first unit 20 and the second units 30 varies depending on the positions of the blow-out ports of the second units 30, and also varies depending on a property in which the first unit 20 and the second units 30 are installed.

There is resistance (hereinafter, referred to as duct resistance) between the air flowing through the duct 40 and the inner surface of the duct 40, and the static pressure of the air flowing through the duct 40 is reduced by friction. The longer the duct 40, the larger the duct resistance.

Figure 3:
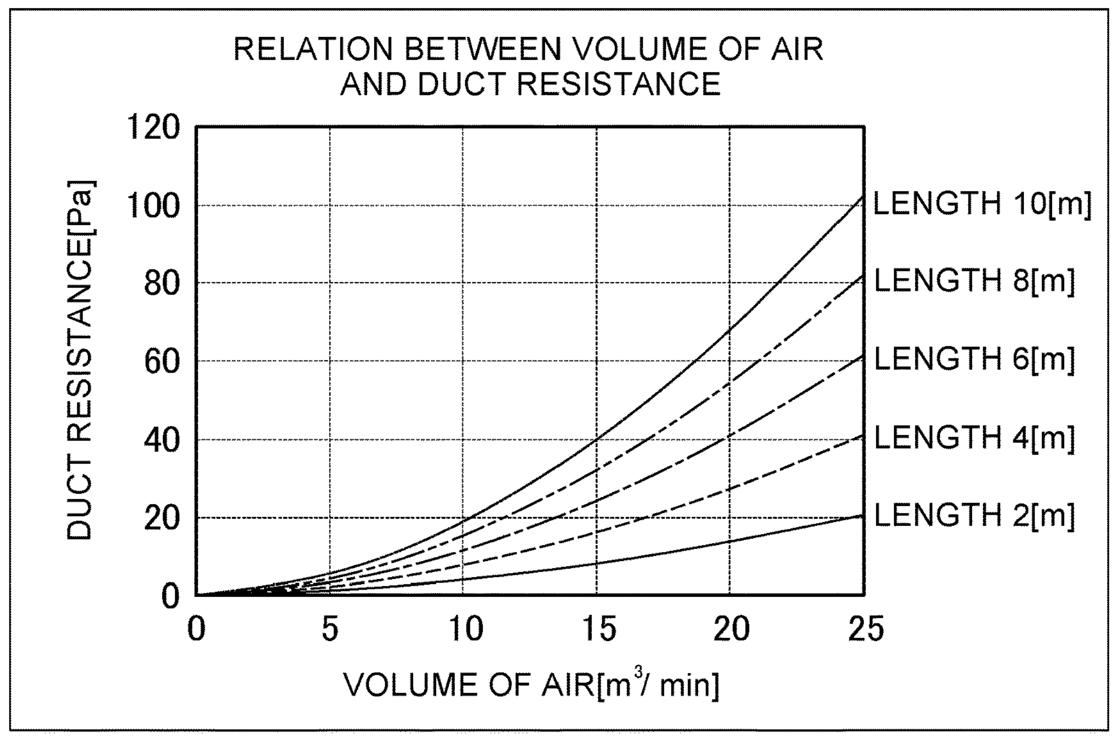
FIG. 3 is a graph indicating a relation between a volume of air and duct resistance using duct length as a parameter.

FIG. 3 is a graph indicating a relation between a volume of air and the duct resistance using the duct length as a parameter. In FIG. 3, the duct resistance changes nonlinearly with respect to the volume of air flowing through the duct 40. Accordingly, the volume of air is not proportional to the rotation speed of the fan. Therefore, the rotation speed for achieving the value of the target air volume cannot be calculated proportionally.

(4-2) Air Sending Characteristics of Second Unit 30

The difference between the static pressure at the blow-out port and the static pressure at the intake port of the second unit 30 is referred to as front-rear differential pressure of the second unit 30.

Figure 4:
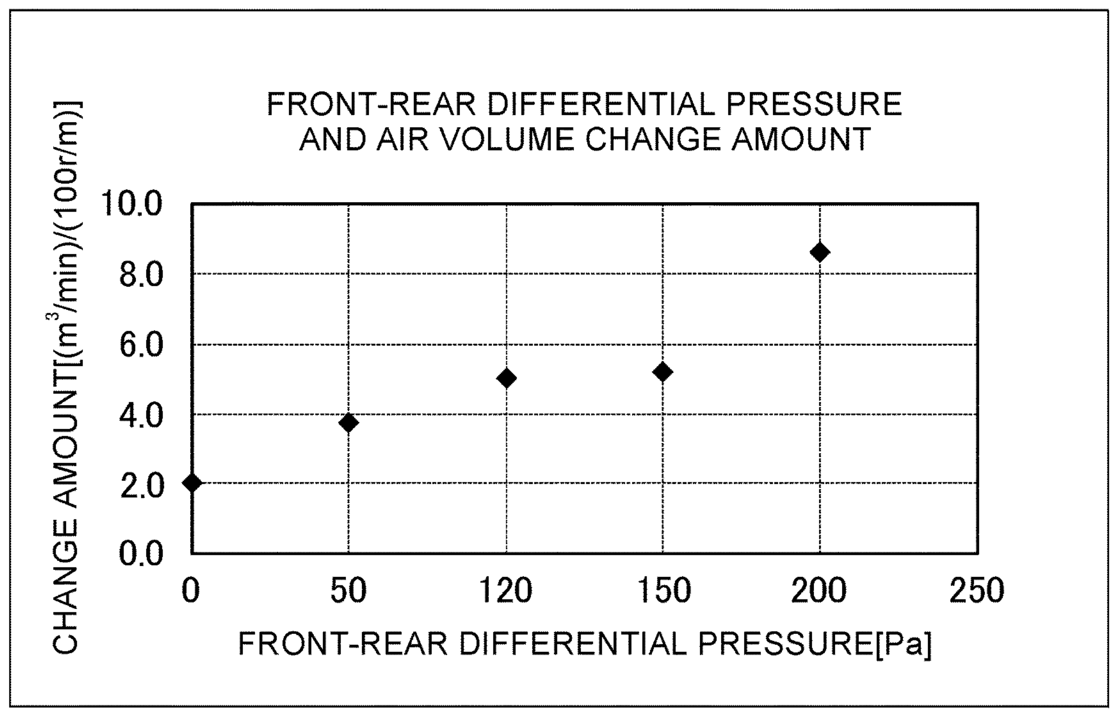
FIG. 4 is a graph indicating results of measuring an air volume change amount when a rotation speed of a fan motor is changed by 1 (r/m) while changing front-rear differential pressure of a second unit.

FIG. 4 is a graph indicating results of measuring an air volume change amount when the rotation speed of the fan motor 31*b* is changed by 1 (r/m) while changing the front-rear differential pressure of the second unit 30. The rotation speed of the fan motor 31*b* before the change is 100 (r/m).

In FIGS. 3 and 4, when the volume of air is changed to adjust the temperature, the duct resistance fluctuates, so that the front-rear differential pressure of the second unit 30 changes. Since the volume of air that changes when the rotation speed of the fan is changed by 1 (r/m) varies depending on the situation (front-rear differential pressure) at that time, adjustment is difficult. Therefore, the target air volume may not be reached unless the rotation speed of the fan is adjusted in consideration of the change in duct resistance.

Figure 5:
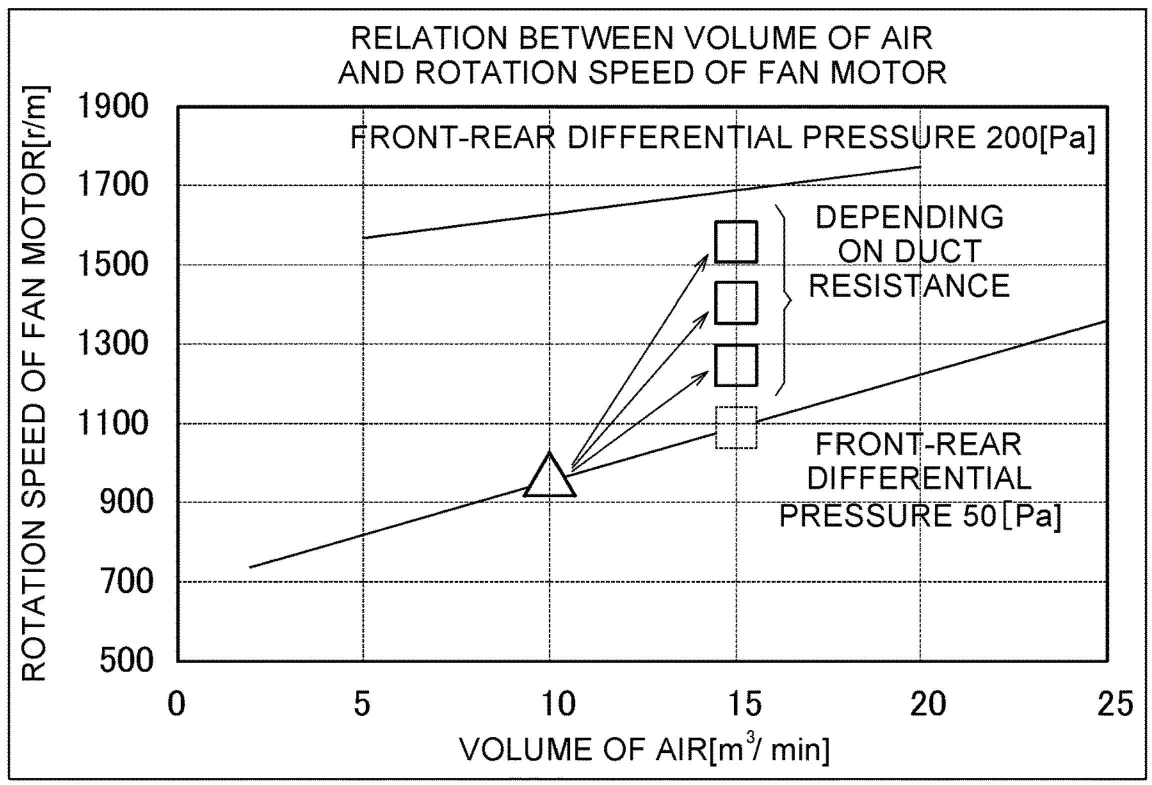
FIG. 5 is a graph indicating a relation between the volume of air and the rotation speed of the fan motor using the front-rear differential pressure as a parameter.

For example, as illustrated in FIG. 5, even when the volume of air is changed from 10 ($m^3$/min) to 15 ($m^3$/min), the required rotation speed change amount of the fan motor 31*b* varies even with the same air volume change amount as long as the duct resistance is different. This is because the duct resistance also changes depending on the change in volume of air. Therefore, an air volume adjustment function considering a change in duct resistance is required.

Furthermore, in the case where the branch pipes 42 branched off the main pipe 41 are connected to the respective second units 30 as illustrated in FIG. 1, the front-rear differential pressure of one second unit 30 is affected by a change in volume of air of the other second unit 30 and air discharge pressure of the first unit 20.

Figure 6:
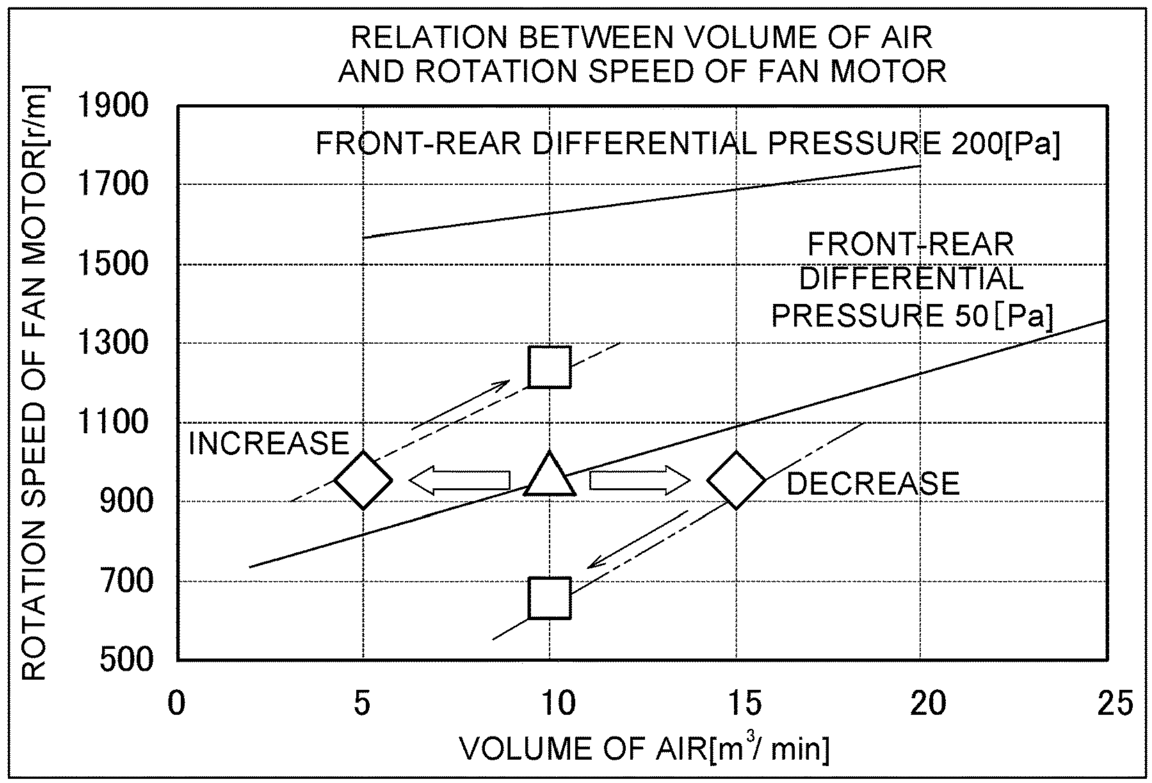
FIG. 6 is a graph indicating a relation between the volume of air and the rotation speed of the fan motor using the front-rear differential pressure as a parameter.

Furthermore, as illustrated in FIG. 6, when the volume of air of the other second unit 30 or the air discharge pressure from the first unit 20 is changed and the front-rear differential pressure is increased to the dotted line in FIG. 6, simply maintaining the rotation speed of the fan motor 31*b* leads to a decrease in the volume of air from 10 ($m^3$/min) to 5 ($m^3$/min). Therefore, the rotation speed of the fan motor 31*b* needs to be increased in order to maintain the initial volume of air 10 ($m^3$/min).

On the other hand, when the front-rear differential pressure is decreased to a two-dot chain line in FIG. 6, maintaining the rotation speed of the fan motor 31*b* leads to an increase in the volume of air from 10 ($m^3$/min) to 15 ($m^3$/min). Accordingly, the rotation speed of the fan motor 31*b* needs to be reduced in order to maintain the initial volume of air 10 ($m^3$/min).

Therefore, the second unit 30 requires also an air volume maintaining function considering a change in front-rear differential pressure.

(5) Air Volume Control

As described above, it has been found that the air volume control for one second unit 30 requires the air volume maintaining function considering the duct resistance, the volume of air of the other second unit 30, and the air discharge pressure of the first unit 20. However, the duct length varies depending on the property in which the first unit 20 and the second units 30 are installed or the installation position of the second units 30, and the duct resistance also fluctuates depending on the duct length and the volume of air flowing through the duct. Therefore, it is difficult to convert the relation between the rotation speed and the volume of air of the fan motor 31*b* into data by conventional trial run adjustment.

In view of the above, the applicant focuses attention on the fact that the change in duct resistance appears as front-rear differential pressure, and has found that the rotation speed target value for the fan motor 31*b* or the rotation speed change amount of the fan motor 31*b* is calculated by a function using a variable obtained by acquiring information about the volume of air, a wind speed, or the front-rear differential pressure of the second unit 30, in addition to the rotation speed and the value of the target air volume of the fan motor 31*b*.

This reduces the number of man-hours for a preliminary test, and eliminates the need for a trial run at the time of duct connection. An air volume control logic will be described below.

(5-1) Derivation of Front-Rear Differential Pressure ΔP

Figure 7:
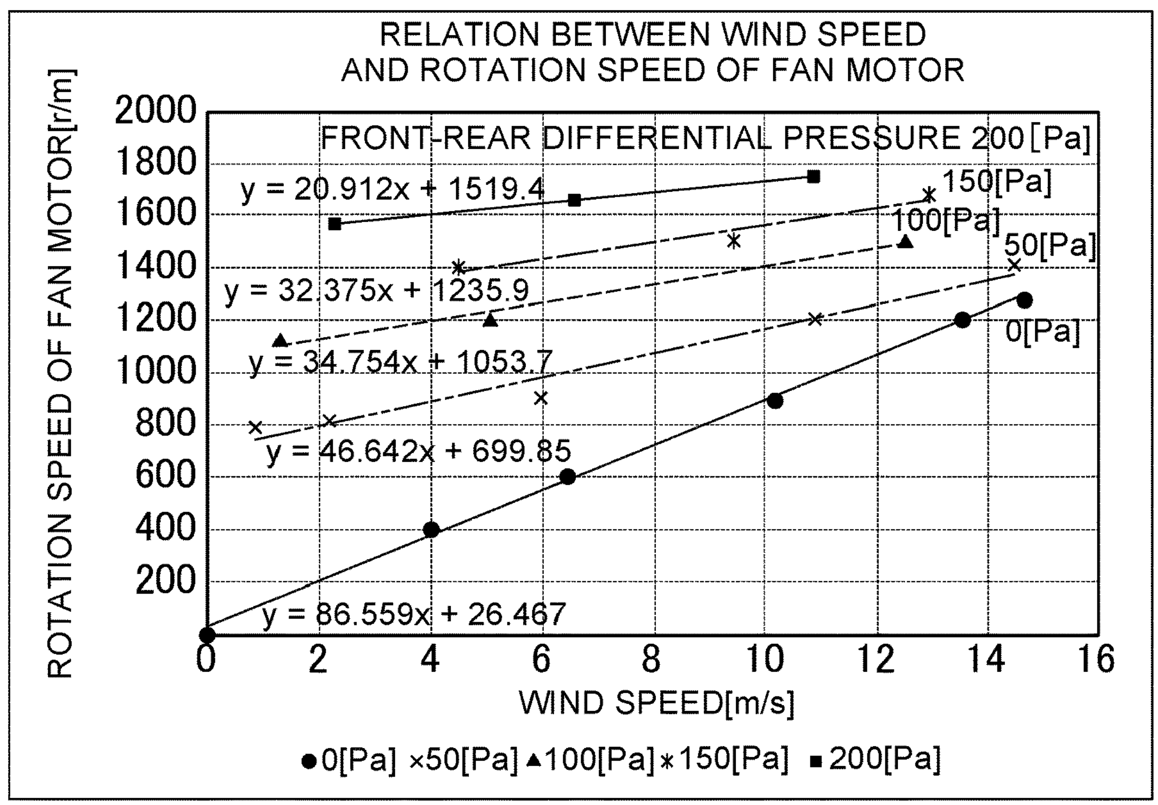
FIG. 7 is a graph indicating a relation between a wind speed and the rotation speed of the fan motor using the front-rear differential pressure as a parameter.

FIG. 7 is a graph indicating a relation between a wind speed V and a rotation speed N of the fan motor 31*b* using front-rear differential pressure ΔP as a parameter. In FIG. 7, when the front-rear differential pressure ΔP is the same, the rotation speed N of the fan motor 31*b* can be expressed by a linear expression of the wind speed V by using a coefficient a and a constant term b.

$$N=a\times V+b \tag{1}$$

As illustrated in FIG. 7, when the front-rear differential pressure is constant, the equation (1) can be derived by performing a test for obtaining values of at least three points.

Figure 8:
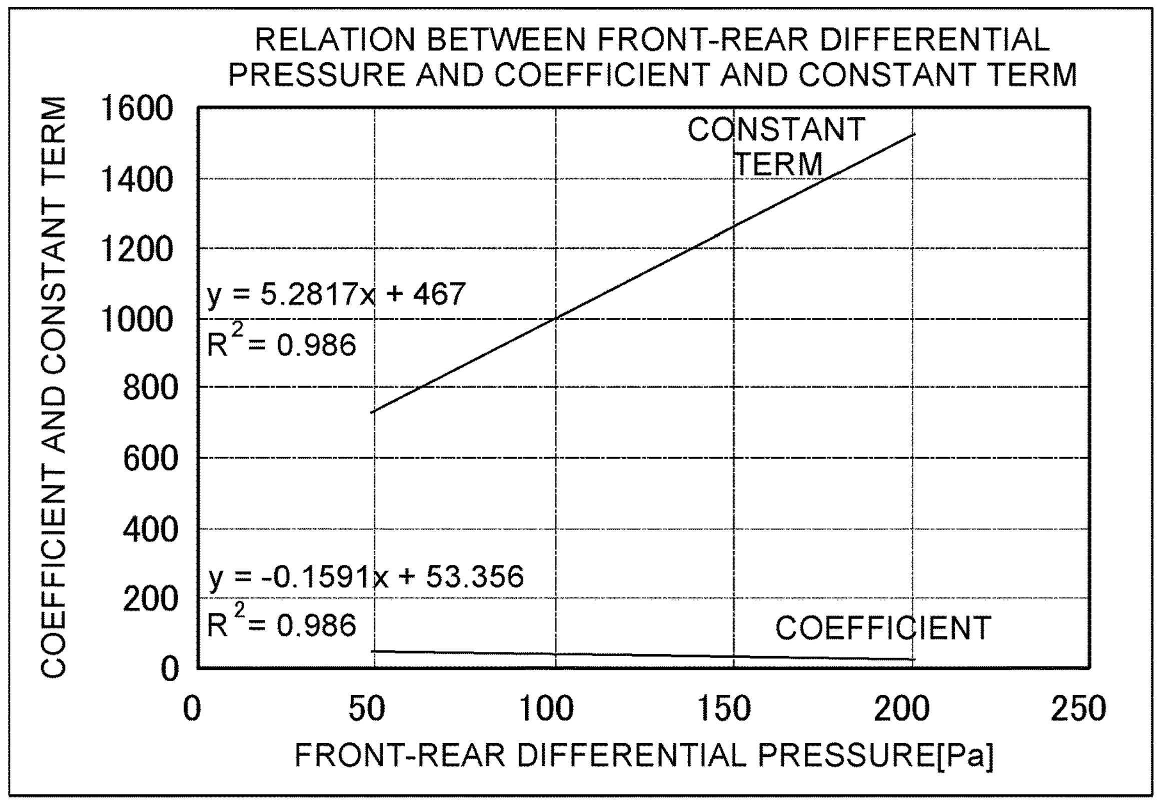
FIG. 8 is a graph indicating a relation between the front-rear differential pressure and a coefficient and a constant term derived from FIG. 7.

Furthermore, FIG. 8 is a graph indicating a relation between the front-rear differential pressure ΔP and the coefficient a and the constant term b derived from FIG. 7. In FIG. 8, the relation between the front-rear differential pressure ΔP and the coefficient a and the constant term b can be expressed by the following equations.

$$a=m\times\Delta P+n \tag{2}$$

$$b=p\times\Delta P+q \tag{3}$$

From the above equations (1), (2), and (3), the relation among the rotation speed N, the wind speed V, and the front-rear differential pressure ΔP is expressed by the following equation.

$$N=(m\times\Delta P+n)\times V+(p\times\Delta P+q) \tag{4}$$

From the equation (4), the following equation is further derived.

$$\Delta P=(N-n\times V-q)/(m\times V+p) \tag{5}$$

The equation (5) means that the front-rear differential pressure ΔP can be calculated by measuring the wind speed V when the fan motor 31*b* of the second fan 31 operates at the rotation speed N.

Therefore, the rotation speed N of the fan motor 31*b*, the wind speed V or volume of air Q of the second fan 31, and the front-rear differential pressure ΔP are parameters having a relation in which, from two values of them, the remaining one value is derived.

(5-2) Air Volume Adjustment Function Considering Change in Duct Resistance

An equation for calculating a rotation speed target value Ny can be derived from the above equation (5) and a theoretical formula of the fan. The relation among current front-rear differential pressure ΔPx, a current volume of air Qx, a front-rear differential pressure target value ΔPy, and an air volume target value Qy is expressed by an equation below from the theoretical formula of the fan.

$$\Delta Py/\Delta Px=(Qy/Qx)^2 \tag{6}$$

From the above equations (5) and (6), the following equation holds.

$$(Ny-n\times Vy-q)/(m\times Vy+p)=(Qy/Qx)^2\times\Delta Px \tag{7}$$

Furthermore, since Vy=(Qy/Qx)×Vx, the following equation holds.

$$Ny=(Qy/Qx)^2\times\Delta Px\times\{m\times(Qy/Qx)\times Vx+p\}+n\times(Qy/Qx)\times Vx+q \tag{8}$$

Hereinafter, the equation (8) is referred to as a first function.

Figure 9:
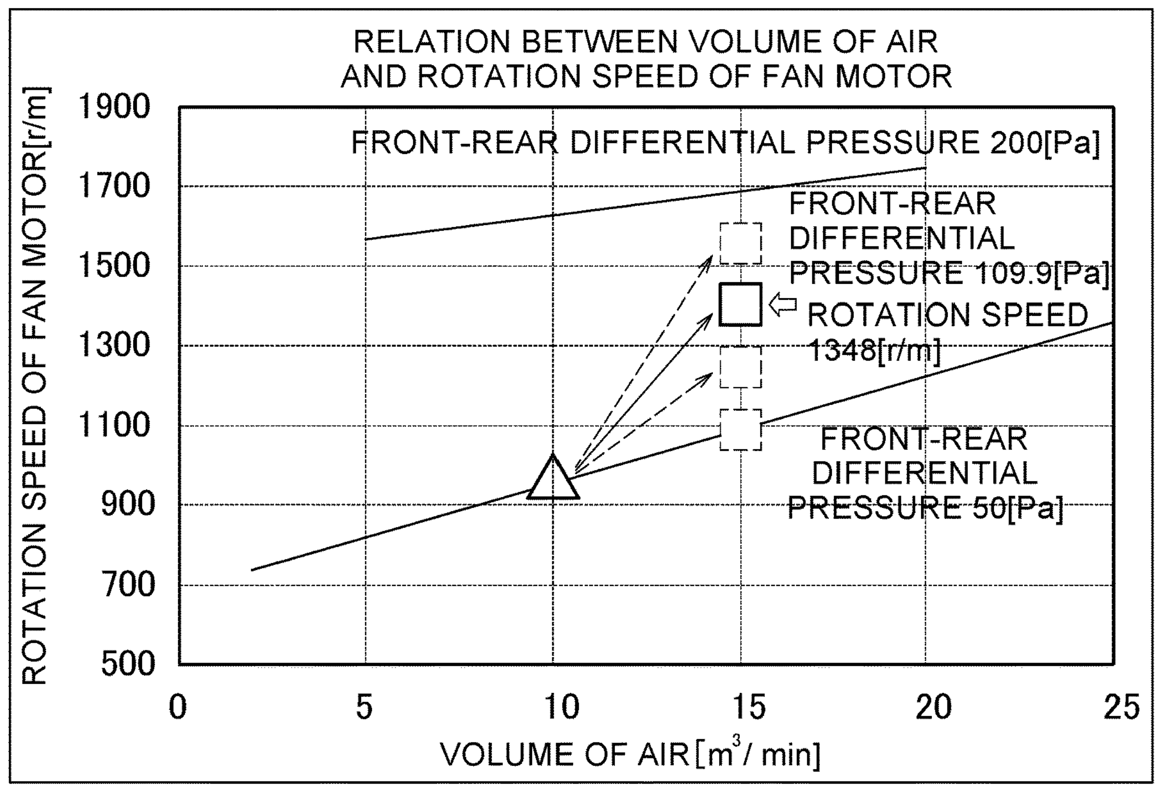
FIG. 9 is a graph indicating a relation between the volume of air and the rotation speed of the fan motor using the front-rear differential pressure as a parameter.

Technical significance of the first function will be described with reference to FIG. 9. FIG. 9 is a graph indicating a relation between the volume of air and the rotation speed of the fan motor 31*b* using the front-rear differential pressure ΔP as a parameter. In FIG. 9, the change in duct resistance appears as a change in front-rear differential pressure ΔP.

For example, the rotation speed of the fan motor 31*b* for maintaining the volume of air 10 ($m^3$/min) at the front-rear differential pressure 50 (Pa) is 920 (r/m). If the duct resistance is constant irrespective of the volume of air, when the volume of air is changed to 15 ($m^3$/min), the rotation speed may be simply set to 1100 (r/m).

However, the duct resistance changes by changing the volume of air. According to FIG. 9, by changing the volume of air to 15 ($m^3$/min), the front-rear differential pressure increases to 109.9 (Pa) due to the change in duct resistance. In order to maintain the volume of air 15 ($m^3$/min) when the front-rear differential pressure is 109.9 (Pa), it is necessary to maintain the rotation speed of the fan motor 31*b* at 1348 (r/m).

Therefore, the air volume adjustment function considering the change in duct resistance is required, and the rotation speed Ny in the first function (the above equation (8)) is the rotation speed considering the change in duct resistance.

When the air volume target value Qy, which is an instruction value of the volume of air from the first controller 51, is changed, the second controller 52 calculates the rotation speed target value for the fan motor 31*b* of the second fan 31 by using the first function.

(5-3) Air Volume Adjustment Function Considering Change in Front-Rear Differential Pressure If the front-rear differential pressure ΔP does not fluctuate even after the rotation speed of the fan motor 31*b* reaches the rotation speed target value, the rotation speed is maintained. However, when the volume of air of the other second unit 30 or the air discharge pressure of the first unit 20 is changed, the front-rear differential pressure ΔP fluctuates.

Figure 10:
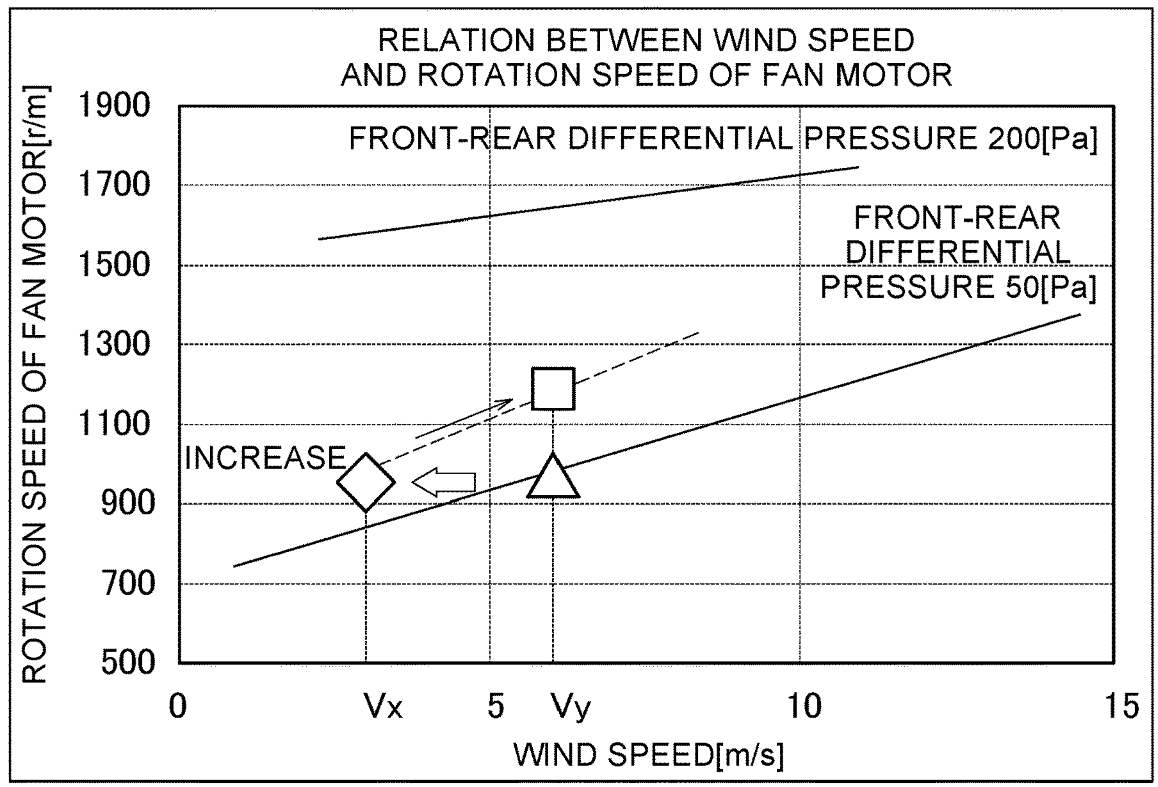
FIG. 10 is a graph indicating a relation between the wind speed and the rotation speed of the fan motor.

FIG. 10 is a graph indicating a relation between the wind speed and the rotation speed of the fan motor 31*b*. In FIG. 10, for example, the rotation speed of the fan motor 31*b* necessary to maintain the wind speed target value Vy at the front-rear differential pressure 50 (Pa) is 980 (r/m).

Here, when the front-rear differential pressure ΔP is increased to the dotted line in FIG. 10, simply maintaining the rotation speed of the fan motor 31*b* at 980 (r/m) leads to a decrease in the wind speed to Vx, so that the volume of air becomes insufficient.

In order to maintain the air volume target value, it is necessary to recover the wind speed from Vx to Vy, and it is necessary to increase the rotation speed of the fan motor 31*b* by 200 (r/m) to 1180 (r/m).

The rotation speed change amount ΔN of the fan motor 31*b* is expressed by the following equation from the equations (2) and (4).

$$\Delta N = a \times (Vy - Vx) \quad (9)$$

Hereinafter, the equation (9) is referred to as a second function.

The second function is used when calculating the rotation speed change amount when the air volume target value Qy is not changed but the rotation speed of the fan motor 31*b* needs to be changed due to the fluctuation of the front-rear differential pressure ΔP.

Figure 11:
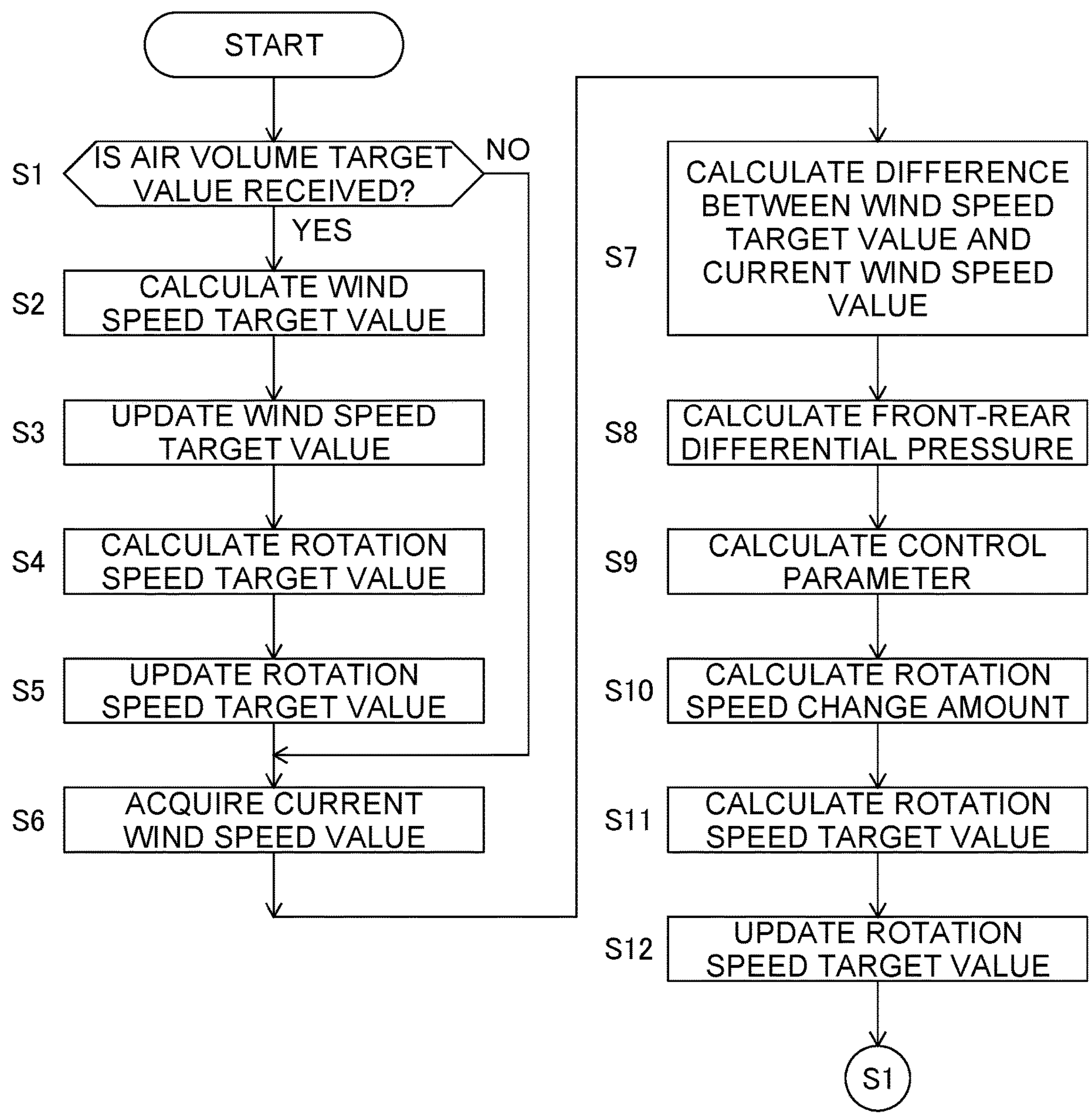
FIG. 11 is a flowchart of air volume control.

FIG. 11 is a flowchart of air volume control. The air volume control will be described below with reference to FIG. 11.

(Step S1)

First, in step S1, the second controller 52 determines whether or not the air volume target value Qy is received from the first controller 51. When the second controller 52 receives the air volume target value Qy, the process proceeds to step S2. When the second controller 52 does not receive the air volume target value Qy, the process proceeds to step S6.

(Step S2)

Next, in step S2, the second controller 52 calculates the wind speed target value Vy for achieving the air volume target value Qy.

(Step S3)

Next, in step S3, the second controller 52 updates the wind speed target value Vy to the value calculated in step S2.

(Step S4)

Next, in step S4, the second controller 52 calculates the rotation speed target value Ny for the fan motor 31*b* for achieving the wind speed target value Vy updated in step S3 using the first function.

(Step S5)

Next, in step S5, the second controller 52 updates the rotation speed target value for the fan motor 31*b* to the value Ny calculated in step S4. After updating the rotation speed target value to Ny, the second controller 52 controls the rotation speed of the fan motor 31*b* to reach the target value.

(Step S6)

Next, in step S6, the second controller 52 acquires a detected value of the second air volume detector 32 as the current wind speed value Vx.

(Step S7)

Next, in step S7, the second controller 52 calculates the difference between the wind speed target value Vy and the current wind speed value Vx.

(Step S8)

Next, in step S8, the second controller 52 calculates the front-rear differential pressure ΔP.

(Step S9)

Next, in step S9, the second controller 52 calculates a coefficient a as a control parameter.

(Step S10)

Next, in step S10, the second controller 52 calculates the rotation speed change amount ΔN by applying the difference between the wind speed target value Vy and the current wind speed value Vx calculated in step S7 and the coefficient a calculated in step S9 to the second function.

(Step S11)

Next, in step S11, the second controller 52 calculates the rotation speed target value Ny on the basis of the rotation speed change amount ΔN calculated in step S10.

(Step S12)

Next, in step S12, the second controller 52 updates the rotation speed to the rotation speed target value Ny calculated in step S11. Then, the process by the second controller 52 returns to step S1.

As described above, when there is an instruction of the air volume target value from the first controller 51, a first program from step S1 to step S5 is executed, but when there is no instruction of the air volume target value from the first controller 51, a second program from step S6 to step S12 is executed.

The first program is for calculating the rotation speed target value by using the first function, and the second program is for calculating the rotation speed change amount by using the second function.

Furthermore, the rotation speed target value Ny can also be calculated by using the second function, and the second controller 52 can switch between the first program and the second program. Therefore, even when the second unit 30 acquires a new air volume target value Qy or a new wind speed target value Vy, the second unit 30 can control the rotation speed while calculating the rotation speed change amount ΔN by using the second function without using the first function.

(6) Features (6-1)

The second controller 52 acquires: a rotation speed Nx of the fan motor 31*b* of the second fan 31; the volume of air Qx, the wind speed Vx, or the front-rear differential pressure ΔPx of the second fan 31; and the air volume target value Qy or the wind speed target value Vy for the second fan 31, and calculates the rotation speed target value Ny for the fan motor 31*b* by using the first function: $Ny=(Qy/Qx)^2\times\Delta Px\times\{m\times(Qy/Qx)\times Vx+p\}+n\times(Qy/Qx)\times Vx+q$. Furthermore, when the front-rear differential pressure ΔP fluctuates and the wind speed is decreased from Vy to Vx, the second controller 52 calculates the rotation speed change amount ΔN to the rotation speed target value by using the second function: $\Delta N=a\times(Vy-Vx)$.

In the fan unit, the "front-rear differential pressure (ΔP)", which has not been conventionally taken into consideration, is introduced as a variable into the calculation of the rotation speed target value. As a result, a required volume of air can be more accurately achieved than in the conventional control.

(6-2)

The first function and the second function use, as variables, the rotation speed Nx of the fan motor 31*b* of the second fan 31, the volume of air Qx or the wind speed Vx of the second fan 31, the front-rear differential pressure ΔP, and the air volume target value Qy or the wind speed target value Vy for the second fan 31. The rotation speed of the fan motor 31*b*, the volume of air or the wind speed of the fan, and the front-rear differential pressure are parameters having relation in which, from two values of them, the remaining one value is derived.

In the second unit 30, the first function and the second function enable calculation of the rotation speed target value Ny or the rotation speed change amount ΔN, which reduces the number of man-hours for a preliminary test, and eliminates the need for a trial run at the time of duct connection.

(6-3)

When the front-rear differential pressure ΔP is the same, the rotation speed N of the fan motor 31*b* can be expressed by a linear expression ($N=a\times V+b$) of the wind speed V of the fan. Therefore, a correlation between the rotation speed N and the wind speed V can be acquired in advance by using a wind speed sensor using the front-rear differential pressure as a parameter. It can be understood that the coefficient and the constant with respect to the front-rear differential pressure are linear by plotting the coefficient and the constant for each front-rear differential pressure on the basis of the correlation between the acquired rotation speed N and wind speed V.

Accordingly, in the second unit 30, the coefficient and the constant can be calculated for each front-rear differential pressure on the basis of the calculation formula obtained from a result of a wind speed measurement test performed while changing the rotation speed of the fan motor 31*b* in advance.

(6-4)

In the second unit 30, the second controller 52 performs control such that the greater the front-rear differential pressure ΔP, the smaller the rotation speed change amount of the fan motor 31*b* per unit volume of air.

(6-5)

The second controller 52 can switch between the first program for calculating the rotation speed target value Ny for the fan motor 31*b* by using the first function and the second program for calculating the rotation speed change amount ΔN of the fan motor 31*b* by using the second function. Furthermore, when acquiring a new air volume target value Qy or a new wind speed target value Vy, the second unit 30 may use either the first function or the second function.

(6-6)

When acquiring the air volume target value Qy or the wind speed target value Vy from the first controller 51, the second controller 52 executes the first program to calculate the rotation speed target value Ny for the fan motor 31*b*. Furthermore, after acquiring the air volume target value Qy or the wind speed target value Vy from the first controller 51, the second controller 52 switches to the second program to calculate the rotation speed change amount ΔN of the fan motor 31*b* by the second function until the next acquisition of the air volume target value Qy or the wind speed target value Vy.

(7) Modifications

The first unit 20 includes the first fan 21 in the above embodiment, but the first unit 20 does not necessarily need the first fan 21. The air volume control according to the present disclosure is also applicable to a second unit connected to a first unit not including a fan through a duct.

Specific examples will be described below.

(7-1) First Modification

Figure 12:
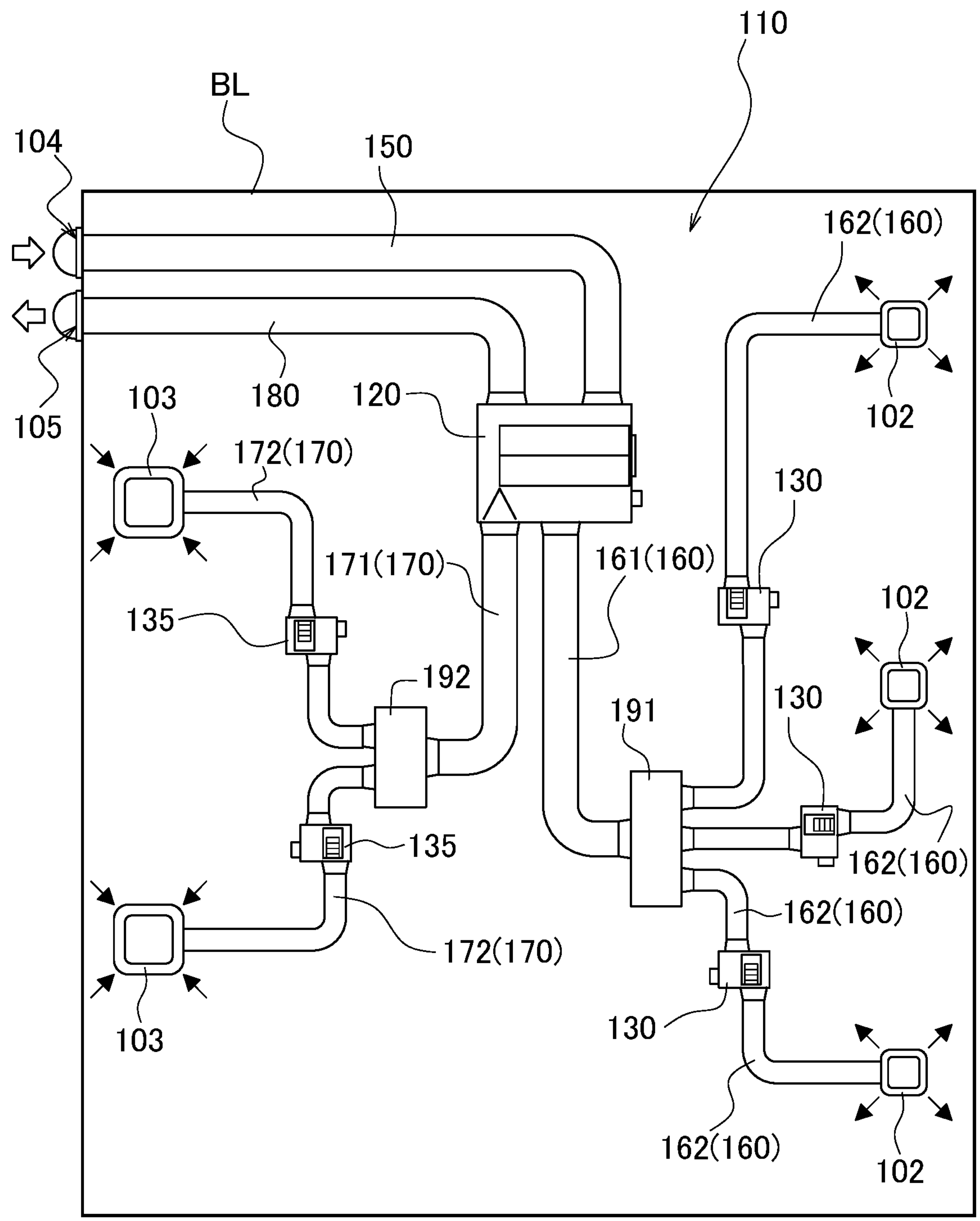
FIG. 12 is a configuration diagram of an air supply system equipped with fan units according to a first modification.

FIG. 12 is a configuration diagram of an air supply system 110 equipped with fan units according to a first modification. The air supply system 110 in FIG. 12 is disposed behind a ceiling of a floor of a building BL, and ventilates a room. The air supply system 110 includes a first unit 120 as an air treatment unit, second units 130 as air supply fan units, and third units 135 as air exhaust fan units.

The air supply system 110 further includes an outdoor air duct 150, a supply air duct 160, a return air duct 170, and an exhaust air duct 180. The outdoor air duct 150, the supply air duct 160, the return air duct 170, and the exhaust air duct 180 are connected to the first unit 120.

The outdoor air duct 150 constitutes an air flow path leading from an opening 104 leading to the outside of the building BL to the first unit 120. The supply air duct 160 constitutes an air flow path leading from the first unit 120 to blow-out ports 102 provided in the room.

The return air duct 170 constitutes an air flow path leading from intake ports 103 provided in the room to the first unit 120. The exhaust air duct 180 constitutes an air flow path leading from the first unit 120 to an opening 105 leading to the outside of the building BL.

The supply air duct 160 includes a single main duct 161 and a plurality of branch ducts 162 branched off the main duct 161 via a branch chamber 191.

The return air duct 170 includes a single main duct 171 and a plurality of branch ducts 172 branched off the main duct 171 via a branch chamber 192.

The first unit 120 removes dust in air passing through the unit, changes temperature of the air, changes humidity of the air, and removes predetermined chemical composition and a predetermined pathogen in the air.

The second units 130 are connected to the supply air duct 160. The third units 135 are connected to each corresponding return air duct 170.

In the air supply system 110, the first unit 120 does not include any fans, so that the second units 130 and the third units 135 generate a flow of air in the first unit 120.

Therefore, a change in front-rear differential pressure of one second unit 130 is mainly caused by changes in volume of air of fans of the other second units 130. Furthermore, a change in front-rear differential pressure of one third unit 135 is mainly caused by a change in volume of air of a fan of the other third unit 135.

In the first modification, the "front-rear differential pressure" is introduced as a variable of the calculation formula for the rotation speed target value similarly to the above embodiment. Accordingly, it is possible to reflect the change in duct resistance that changes from moment to moment in the calculation of the air volume target value, and to shorten the response time of the output value (volume of air) to the input value (rotation speed).

(7-2) Second Modification

Figure 13:
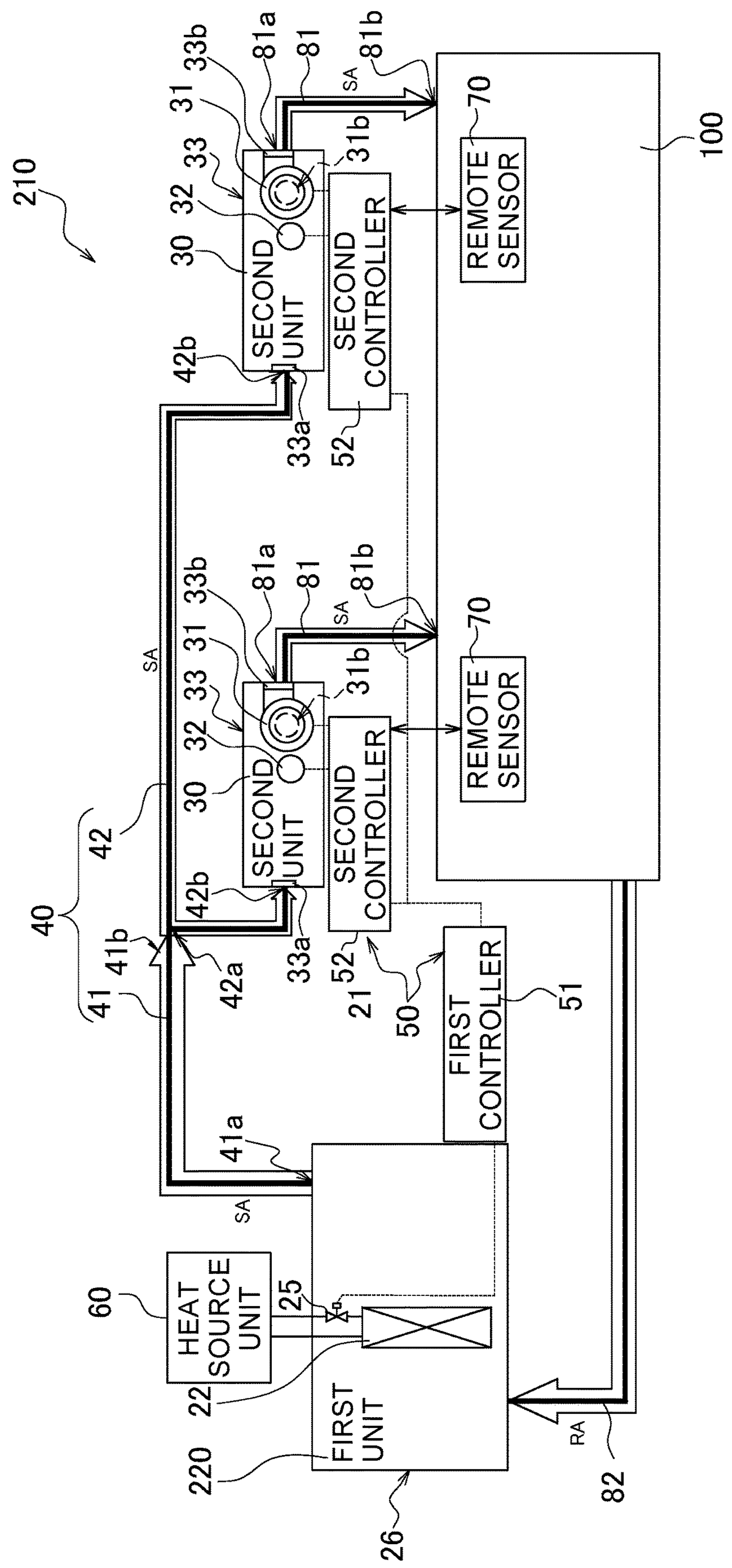
FIG. 13 is a configuration diagram of an air supply system equipped with fan units according to a second modification.

FIG. 13 is a configuration diagram of an air supply system 210 equipped with fan units according to a second modification. The air supply system 210 in FIG. 13 is disposed behind a ceiling of a floor of a building.

The air supply system 210 differs from the air supply system 10 in FIG. 1 in that the first unit does not include a first fan, and other configurations are the same as those of the air supply system 10 in FIG. 1. Therefore, components same as those of the air supply system 10 in FIG. 1 will be denoted by the same reference signs and description thereof is omitted.

A utilization-side heat exchanger 22 of a first unit 220 is supplied with heat energy required for heat exchange from the heat source unit 60. The first unit 220 generates conditioned air through heat exchange in the utilization-side heat exchanger 22.

The first unit 220 is connected to the duct 40. The duct 40 includes the main pipe 41 and the branch pipes 42. The main pipe 41 has one end connected to the first unit 220. The main pipe 41 has the other end branched and connected to a plurality of branch pipes 42. Each branch pipe 42 has a terminal end connected to one second unit 30.

Each second unit 30 includes a second fan 31. The second fan 31 rotates to suck the conditioned air generated in the first unit 220 into the second unit 30 through the duct 40, and then supplies the conditioned air to the target space 100.

A fan motor 31*b* of each second fan 31 is configured to change the rotation speed individually. Each fan motor 31*b* changes the rotation speed individually to change the supply air volume of the corresponding second unit 30 individually.

In the air supply system 210, the first unit 220 does not include any fans, so that the second units 30 generate a flow of air in the first unit 220.

Therefore, the change in front-rear differential pressure of one second unit 30 is mainly caused by a change in volume of air of the second fan 31 of the other second unit 30. However, since the "front-rear differential pressure" is introduced as a variable of the calculation formula for the rotation speed target value, it is possible to reflect the change in duct resistance that changes from moment to moment in the calculation of the air volume target value, and to shorten the response time of the output value (volume of air) to the input value (rotation speed).

(8) Others (8-1)

In the above embodiment and modifications, the front-rear differential pressure is calculated on the basis of the value of the wind speed or the volume of air acquired from the second air volume detector 32. However, the front-rear differential pressure value may be calculated from sensor values of a pressure sensor disposed at each of the intake port and the blow-out port of the second unit, and the wind speed value may be obtained from the front-rear differential pressure and the rotation speed.

(8-2)

In FIG. 7, changes in wind speed of a fan when the rotation speed of a fan motor is changed are observed at five front-rear differential pressures. This is utilized as data for deriving a relational expression of the rotation speed, the wind speed, and the front-rear differential pressure, but does not necessarily require data for five front-rear differential pressures, and the relational expression can be derived if there is data for at least three front-rear differential pressures.

The embodiment of the present disclosure has been described above. It will be understood that various changes to modes and details can be made without departing from the spirit and scope of the present disclosure recited in the claims.

EXPLANATION OF REFERENCE

20: first unit
30: second unit (fan unit)
31: second fan (fan)
31*b*: fan motor
32: second air volume detector (second acquisition unit)
33: casing
33*a*: intake port
33*b*: blow-out port
40: duct
50: controller (control unit)
51: first controller (third acquisition unit)
52: second controller (first acquisition unit)
120: first unit
130: second unit (fan unit)
135: third unit (fan unit)
160: supply air duct (duct)
170: return air duct (duct)

CITATION LIST

Patent Literature

Patent Literature 1: JP H10-253132 A

The invention claimed is:

1. A fan unit comprising:

a fan that supplies air to a target space;

a casing that has an intake port and a blow-out port and houses the fan;

a controller that acquires an air volume target value or a wind speed target value for the fan and further acquires a rotation speed of a fan motor that drives the fan, the controller controlling the rotation speed of the fan motor to a rotation speed target value corresponding to the air volume target value or the wind speed target value of the fan; and a detector that acquires information about at least one from among a volume of air, a wind speed, and front-rear differential pressure that is a difference in air pressure between the intake port and the blow-out port of the casing, of the fan, wherein the controller uses a first function or a second function that uses, as variables: the rotation speed of the fan motor; the volume of air, the wind speed, or the front-rear differential pressure of the fan; and the air volume target value or the wind speed target value for the fan, the first function and the second function being derived on the basis of that the front-rear differential pressure changes due to fluctuation of resistance of the duct connected to the fan unit when the volume of air flowing through the fan unit is changed, the controller, when the controller acquires the air volume target value, calculates the rotation speed target value for the fan motor by the first function, and when the front-rear differential pressure fluctuates and the acquired volume of air or the acquired wind speed fluctuates from the air volume target value or the wind speed target value, calculates a rotation speed change amount from the rotation speed to the rotation speed target value for the fan motor b the second function, and wherein the controller performs control such that the greater the front-rear differential pressure, the smaller the rotation speed change amount of the fan motor e unit volume of air.

2. The fan unit according to claim 1, wherein the first function and the second function use, as variables, the rotation speed of the fan motor, the volume of air or the wind speed of the fan, the front-rear differential pressure, and the air volume target value or the wind speed target, value for the fan, and the rotation speed of the fan motor, the volume of air or the wind speed of the fan, and the front-rear differential pressure are parameters having a relation in which, from two values of them, a remaining one value is derived.

3. The fan unit according to claim 2, wherein the first function and the second function are determined on a basis of data of the volume of air or the wind speed of the fan when the rotation speed of the fan motor is changed with respect to the front-rear differential pressure.

4. The fan unit according to claim 1, wherein the controller can switch between a first program for calculating the rotation speed target value for the fan motor by using the first function and a second program for calculating the rotation speed change amount of the fan motor by using the second function.

5. The fan unit according to claim 4, wherein the controller acquires the air volume target value or the wind speed target value a plurality of times, and the controller executes the first program to calculate the rotation speed target value for the fan motor when the controller acquires the air volume target value or the wind speed target value, and switches, after the controller acquires the air volume target value or the wind speed target value, to the second program to calculate the rotation speed change amount of the fan motor by the second function until the next acquisition of the air volume target value or the wind speed target value.

6. The fan unit according to claim 2, wherein the controller can switch between a first program for calculating the rotation speed target value for the fan motor by using the first function and a second program for calculating the rotation speed change amount of the fan motor by using the second function.

7. The fan unit according to claim 3, wherein the controller unit can switch between a first program for calculating the rotation speed target value for the fan motor by using the first function and a second program for calculating the rotation speed change amount of the fan motor by using the second function.

8. The fan unit according to claim 6, wherein the controller acquires the air volume target value or the wind speed target value a plurality of times, and the controller executes the first program to calculate the rotation speed target value for the fan motor when the controller acquires the air volume target value or the wind speed target value, and switches, after the controller acquires the air volume target value or the wind speed target value, to the second program to calculate the rotation speed change amount of the fan motor by the second function until the next acquisition of the air volume target value or the wind speed target value.

9. The fan unit according to claim 7, wherein the controller acquires the air volume target value or the wind speed target value a plurality of times, and the controller executes the first program to calculate the rotation speed target value for the fan motor when the controller acquires the air volume target value or the wind speed target value, and switches, after the controller acquires the air volume target value or the wind speed target value, to the second program to calculate the rotation speed change amount of the fan motor by the second function until the next acquisition of the air volume target value or the wind speed target value.

* * * * *